J. POIRIER.
Axle-Adjuster.

No. 203,768. Patented May 14, 1878.

Attest:
Fred Benjamin
George Thom

Inventor
J. Poirier
By his attorney
Chas. E. Foster

UNITED STATES PATENT OFFICE.

JOSEPH POIRIER, OF OCONTO, WISCONSIN.

IMPROVEMENT IN AXLE-ADJUSTERS.

Specification forming part of Letters Patent No. 203,768, dated May 14, 1878; application filed April 23, 1878.

*To all whom it may concern:*

Be it known that I, JOSEPH POIRIER, of Oconto, Oconto county, Wisconsin, have invented Improvements in Axle-Adjusters, of which the following is a specification:

My invention is a device, constructed as fully described hereinafter, whereby an axle may be readily straightened without removing the wheel.

Figure 1:
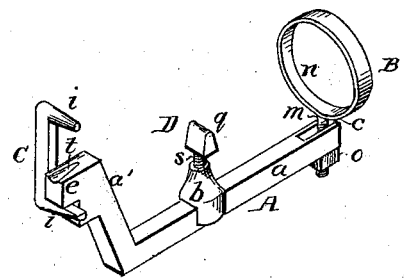
Figure 2:
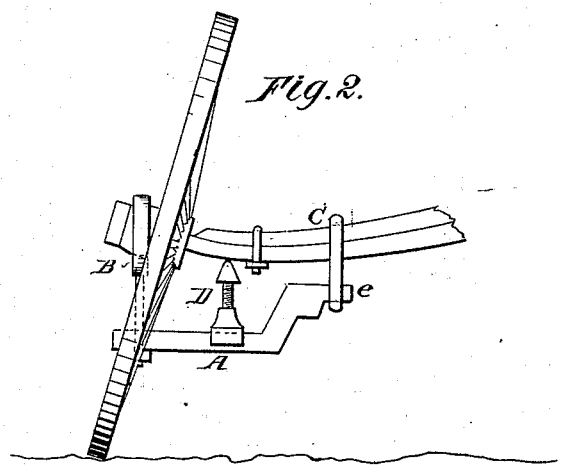

In the drawing, which forms a part of this specification, Figure 1 is a perspective view, showing the device in a position to be applied to straighten an axle. Fig. 2 is a side elevation, showing the device applied to an axle and wheel.

The device consists of a lever, A, link B, yoke C, and bearing-piece D. The lever has two arms, $a\ a'$, nearly at right angles, the arm $a$ having a slot, $c$, at the outer end, and the arm $a'$ terminating in a lug, $e$.

The yoke C consists of a bar with two parallel arms, $i\ i$, one of which bears upon the axle, as shown in Fig. 2, while the lug $e$ of the lever bears upon the other.

The link B consists of a ring, $n$, and projecting threaded rod $m$, which extends through the slotted end of the lever and carries a nut, $o$, the ring embracing the hub of the wheel.

The bearing D consists of a block, $p$, recessed to receive the shank of the lever, and having a threaded opening to receive the threaded stem $s$ of a head-block, $q$.

The lever, yoke, and link being hung upon the axle, as described, the block $q$ is turned so that it will be nearly in contact with the bent portion of the axle, when the bearing-piece D is applied between the axle and the lever.

The parts being adjusted as shown and described, the nut $o$ is turned so as to force the bearing-piece against the bend of the axle, which is thereby straightened without removing the wheel.

The retention of the wheel not only avoids the necessity of using a prop or support, but it further prevents the bending or breaking of the journal, of which there would be danger if the link were applied directly thereto.

If the axle is bent in the opposite direction from that shown the device may be applied on the opposite side, the lug $e$ having a channel, $t$, to receive the rounded edge of the overlying wood portion of the axle; and head-blocks $q$, recessed or differing in shape to fit the rounded upper edge of the axle, may be substituted for that shown.

Although advantage is gained from making the bearing D adjustable in length, a single non-adjustable block may be employed, and in some instances it may be fastened to, or form a part of, the lever; and a cam or wedge may be substituted for the nut $o$.

Without, therefore, limiting myself to the precise construction shown,

I claim—

1. The axle-straightener described, consisting of the lever A, having arms $a\ a'$ and a lug, $e$, the yoke C, adapted to clamp the axle and receive the lug $e$, the link B, and tightening device $o$, and the adjustable bearing D, all constructed and adapted to operate as set forth.

2. The combination, with the lever A, of the bearing D, consisting of the block $b$, head $q$, and stem $s$, screwing into said block, as set forth.

In testimony whereof I have signed my name to this specification in the presence of two subscribing witnesses.

JOSEPH POIRIER.

Witnesses:
 W. B. MITCHELL,
 J. C. TINNEY.